United States Patent
Oh et al.

(10) Patent No.: US 8,284,265 B2
(45) Date of Patent: Oct. 9, 2012

(54) APPARATUS, METHOD AND MEDIUM PREVENTING IMAGE DEGRADATION DUE TO SHAKING OF AN IMAGE PHOTOGRAPHING DEVICE

(75) Inventors: Hyun-hwa Oh, Yongin-si (KR); Chang-yeong Kim, Yongin-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 964 days.

(21) Appl. No.: 11/984,311

(22) Filed: Nov. 15, 2007

(65) Prior Publication Data

US 2008/0170128 A1 Jul. 17, 2008

(30) Foreign Application Priority Data

Jan. 17, 2007 (KR) .......................... 10-2007-0005353

(51) Int. Cl.
*H04N 5/228* (2006.01)
(52) U.S. Cl. ............ 348/208.99; 348/208.4; 348/208.13
(58) Field of Classification Search ............. 348/208.99, 348/208.4, 208.13
See application file for complete search history.

(56) References Cited

U.S. PATENT DOCUMENTS

| 7,161,621 | B2 | 1/2007 | Kai et al. | |
|---|---|---|---|---|
| 2002/0063807 | A1* | 5/2002 | Margulis | 348/745 |
| 2002/0176010 | A1* | 11/2002 | Wallach et al. | 348/229.1 |
| 2005/0019000 | A1* | 1/2005 | Lim et al. | 386/46 |
| 2005/0254723 | A1* | 11/2005 | Wu | 382/274 |
| 2006/0126952 | A1* | 6/2006 | Suzuki et al. | 382/233 |
| 2006/0159369 | A1* | 7/2006 | Young | 382/299 |
| 2008/0170128 | A1* | 7/2008 | Oh et al. | 348/208.11 |
| 2008/0170846 | A1* | 7/2008 | Wang | 396/182 |

FOREIGN PATENT DOCUMENTS

| JP | 2004-266648 | | 9/2004 |
|---|---|---|---|
| JP | 2006-33123 | | 2/2006 |
| JP | 2006033123 A | * | 2/2006 |
| JP | 2006-86978 | | 3/2006 |
| KR | 10-2005-0011784 | | 1/2005 |

OTHER PUBLICATIONS

Yeping Su et al., "Global Motion Estimation From Coarsely Sampled Motion Vector Field and the Applications", IEEE Transaction on Circuits and Systems for Video Technology, vol. 15, No. 2, Feb. 2005, pp. 232-242.

Sang Cheol Park et al., "Super-Resolution Image Reconstruction: A Technical Overview", IEEE Signal Processing Magazine, May 2003, pp. 21-36.

Frederic Dufaux et al., "Efficient, Robust, and Fast Global Motion Estimation for Video Coding", IEEE Transactions on Image Processing, vol. 9, No. 3, Mar. 2000, pp. 497-501.

* cited by examiner

*Primary Examiner* — Chieh M Fan
*Assistant Examiner* — Antoinette Spinks
(74) *Attorney, Agent, or Firm* — Staas & Halsey LLP

(57) ABSTRACT

Disclosed are an apparatus and a method of preventing image degradation due to shaking of an image photographing device. An apparatus for preventing image degradation due to shaking of an image photographing device according to an aspect of the present invention includes an image acquiring unit to acquire a plurality of images of a predetermined subject using a second exposure time shorter than a first exposure time, a scale adjusting unit to adjust scales of the plurality of acquired images, and an image restoring unit to restore images of the subject using the plurality of images whose scales are adjusted.

14 Claims, 5 Drawing Sheets

APPARATUS, METHOD AND MEDIUM PREVENTING IMAGE DEGRADATION DUE TO SHAKING OF AN IMAGE PHOTOGRAPHING DEVICE

CROSS-REFERENCE TO RELATED APPLICATIONS

This application claims priority from Korean Patent Application No. 10-2007-0005353 filed on Jan. 17, 2007 in the Korean Intellectual Property Office, the disclosure of which is incorporated herein by reference in its entirety.

BACKGROUND

1. Field

One or more embodiments of the present invention relate to an apparatus and a method of preventing image degradation due to shaking of an image photographing device. More particularly, one or more embodiments of the present invention relate to an apparatus and a method of preventing image degradation due to shaking of an image photographing device that are capable of preventing image degradation due to shaking of an image photographing device while reducing a size and a thickness of the image photographing device.

2. Description of the Related Art

Driven by recent consumer demand, cameras have decreased in size and weight while having increased performance. An example of such a camera is a camera module mounted on a portable apparatus, such as a digital camera or a cellular phone.

Further, auto focusing functions have been added and optical performance of currently available cameras has increased. As a result, a zoom lens is now critical to improved camera performance. Accordingly, it is desirable to prevent image degradation due to shaking resulting from high magnification zooming.

In order to prevent such shaking, various solutions exist including, for example, an optical type (for example, an optical image stabilizer (OIS)), an electrical type (for example, electrical image stabilizer (EIS)), and a digital type (digital image stabilizer (DIS)). Among the various solutions, the optical type is the best in preventing shaking with the least amount of restrictions in performing various functions.

Examples of the optical type include an active prism type, a lens shift type, and a sensor movement type. Each of these types generally has a complicated lens barrel structure resulting in a relatively increased camera size. For this reason, because a camera module should have small size and weight when installed in a portable apparatus, as opposed to a digital camera, it is difficult to apply the optical type to the camera module installed in or mounted on the portable apparatus.

For example, camera size is increased due to installation of an active prism in the active prism type. Similarly, a component for shifting the lens is added and thus a structure is complicated in the lens shift type, and a component for moving a sensor is added and thus a size of a camera is increased in the sensor movement type.

Accordingly, the inventors of the present invention have determined that a method capable of preventing image degradation due to shaking while decreasing a size and a weight of a camera and preventing image quality from being deteriorated due to the shaking is desirable.

Japan Laid-Open Publication No. 2006-033123 describes a device having a sensor of an imaging element. When the sensor detects physical shaking and the physical shaking exceeds a predetermined value, a frame rate at the time an image is being acquired by the imaging element is increased to a frame rate higher than a general frame rate so as to acquire an image at a high speed frame rate, and images of a plurality of acquired frames are synthesized. However, Japan Laid-Open Publication No. 2006-033123 does not suggest a technique to resolve the need for increased memory space caused by the high speed frame rate.

SUMMARY

One or more embodiments of the present invention provide an apparatus and a method of preventing image degradation due to shaking of an image photographing device, caused for example by unsteady hand movements or hand tremors of a user, that are capable of photographing a plurality of images having an exposure time shorter than an automatic exposure time due to the fact that shaking is increased as the exposure time is increased, and preventing image degradation due to shaking of an image using the plurality of photographed images.

Additional aspects and/or advantages of the invention will be set forth in part in the description which follows and, in part, will be apparent from the description, or may be learned by practice of the invention.

To achieve at least the above and/or other aspects and advantages, embodiments of the present invention include an apparatus for preventing image degradation due to shaking of an image photographing device. The apparatus includes an image acquiring unit to acquire a plurality of images of a predetermined subject using a second exposure time shorter than a first exposure time, a scale adjusting unit to adjust scales of the plurality of acquired images, and an image restoring unit to restore images of the subject using the plurality of images whose scales are adjusted.

To achieve at least the above and/or other aspects and advantages, embodiments of the present invention include a method of preventing image degradation due to shaking of an image photographing device. The method includes acquiring a plurality of images of a predetermined subject using a second exposure time shorter than a first exposure time, adjusting scales of the plurality of acquired images, and restoring images of the subject using the plurality of images whose scales are adjusted.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
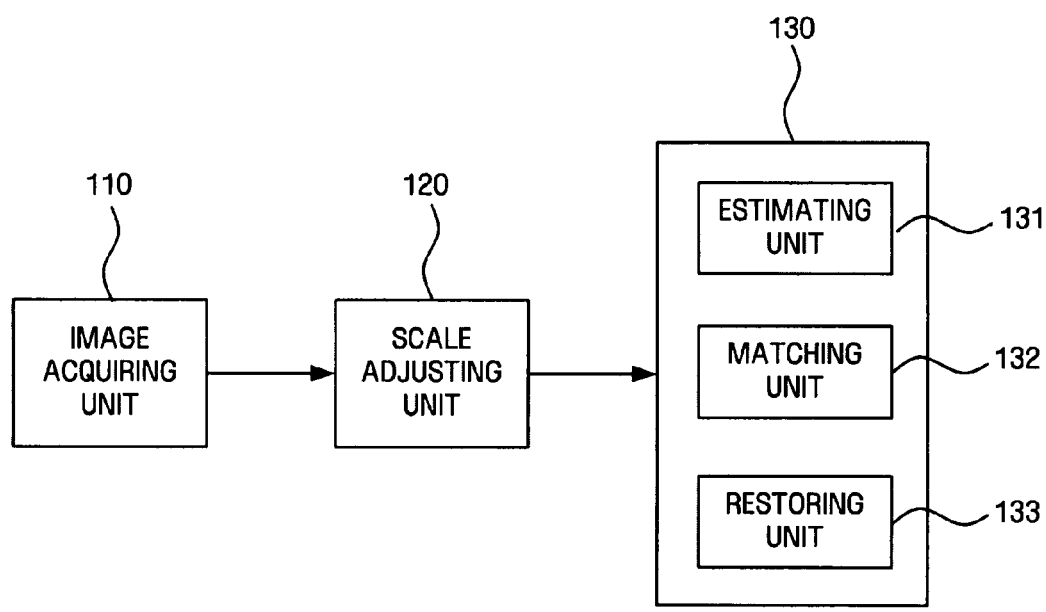
FIG. 1 illustrates an apparatus for preventing image degradation due to shaking of an image photographing device, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates an apparatus preventing image degradation due to shaking of an image photographing device, according to an embodiment of the present invention.

As shown in FIG. 1, an apparatus 100 preventing image degradation due to shaking of an image photographing device, according to an embodiment of the present invention, may include, for example, an image acquiring unit 110, a scale adjusting unit 120, and an image restoring unit 130.

The image acquiring unit 110 may acquire an image of a predetermined subject, and may continuously acquire a plurality of images of a subject for a second exposure shorter than a first exposure time. In an embodiment, the first exposure time may refer to an automatic exposure time, e.g., an exposure time automatically selected by a metering system, and the second exposure time may refer to an exposure time shorter than the first exposure time. Further, the second exposure time may be sufficiently short such that a motion is not generated in the image photographing device and the subject.

The scale adjusting unit 120 may reduce the plurality of images that are acquired by the image acquiring unit 110. Here, the reason for reducing the scales of the plurality of images acquired by the scale adjusting unit 120 is to reduce memory capacity used when the image restoring unit 130 (described below) restores the image of the subject. Specifically, the image restoring unit 130 may restore the image of the subject using the plurality of images that are acquired by the image acquiring unit 110. When the scales of the plurality of acquired images are not reduced, the memory capacity may increase when the image restoring unit 130 restores the image of the subject, which typically increases an operation amount. Accordingly, the scales of the plurality of images acquired by the image acquiring unit 110 are reduced in order to reduce memory capacity used and an operation amount when the image restoring unit 130 restores the image of the subject.

Figure 2:
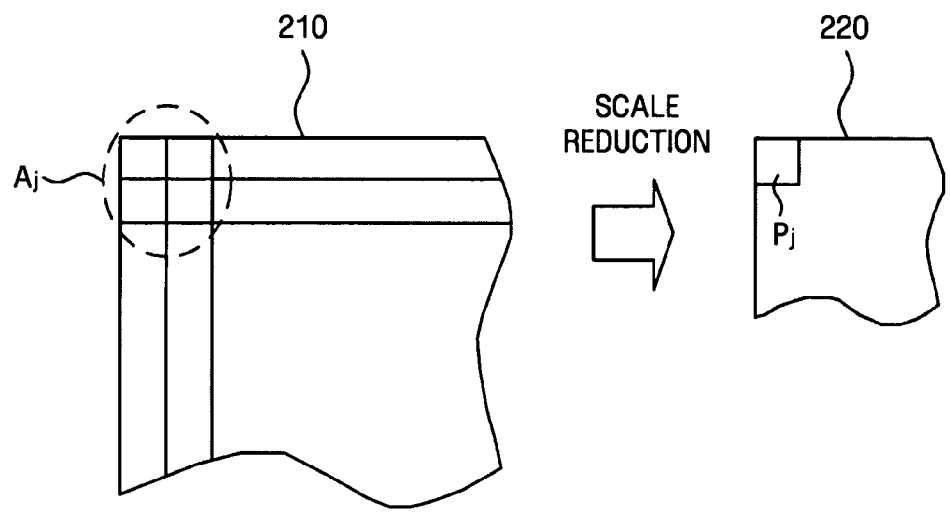
FIG. 2 illustrates an image whose scale is adjusted by a scale adjusting unit, according to an embodiment of the present invention.

As an example of the scale adjusting unit 120 reducing the scale of the image acquired by the image acquiring unit 110, as shown in FIG. 2, the scale adjusting unit 120 may combine pixel values included in a region Aj of the image 210 acquired by the image acquiring unit 110, such that a value of one pixel in the image 220, whose scale is reduced, can be set to Pj. That is, brightness may be compensated for by adding the pixel values included in the region Aj and setting the value of one pixel in the image 220 whose scale is reduced to Pj. FIG. 2 shows an example of a case where four pixel values in the image 210 acquired by the image acquiring unit 110 may be combined and a value of one pixel in the image 220 whose scale is reduced may be set. Here, the scale adjusting unit 120 combining some of pixel values in the image 210 acquired by the image acquiring unit 110 and setting a value of one pixel in the image 220 whose scale is reduced may be changed according to the reduced scale.

Further, the scale adjusting unit 120 may reduce the scale of the image acquired by the image acquiring unit 110 using an average value of pixel values included in the region Aj and a ratio between the first exposure time and the second exposure time. The value of the pixel in the image 220 whose scale is reduced may be calculated from Equation 1 below.

$$Pj = A*R + K \qquad \text{Equation 1:}$$

In Equation 1 above, reference character Pj indicates a value of one pixel in the image 220 whose scale is reduced, reference character A indicates an average value of pixel values that are included in the region Aj of the image 210 acquired by the image acquiring unit 110, reference character R indicates a ratio between the first exposure time and the second exposure time, and reference character K indicates an offset.

In an embodiment as described, the scale adjusting unit 120 combines pixel values included in the region Aj of the image 210 acquired by the image acquiring unit 110 or uses an average value of pixel values included in a predetermined region of the image 210 acquired by the image acquiring unit 110 and a ratio between the first exposure time and the second exposure time in order to reduce the scale of the image acquired by the image acquiring unit 110. However, the described embodiment is only one example to allow the present invention to be easily recognized, and the present invention is not limited thereto.

The image restoring unit 130 may restore the image of the subject using the plurality of images whose scales are adjusted by the scale adjusting unit 120. In order to achieve this, the image restoring unit 130 may include an estimating unit 131 that estimates motion information among a plurality of images whose scales are adjusted by the scale adjusting unit 120, a matching unit 132 that matches the plurality of images whose motion information is estimated, and a restoring unit 133 that restores an image of a subject using the plurality of matched images.

The estimating unit 131 may estimate all of the region motion information among the plurality of images whose scales are adjusted by the scale adjusting unit 120. At this time, examples of a method of estimating all of the region motion information may include a method of directly estimating all of the region motion information, a method of indirectly estimating all of the region motion information, and the like. Since a method of estimating all of the region motion information is described in "Efficient, robust, and fast global motion estimation for video coding (IEEE Trans. Image Processing, vol. 9, no. 3, 2000" and "Global motion estimation from coarsely sampled motion vector field and the applications (IEEE Trans. Circuit and System for video Technology, February 2005)", a more detailed description will be omitted. The embodiment estimating motion information is only one example to allow the present invention to be easily recognized, and the present invention is not limited thereto.

Figure 3:
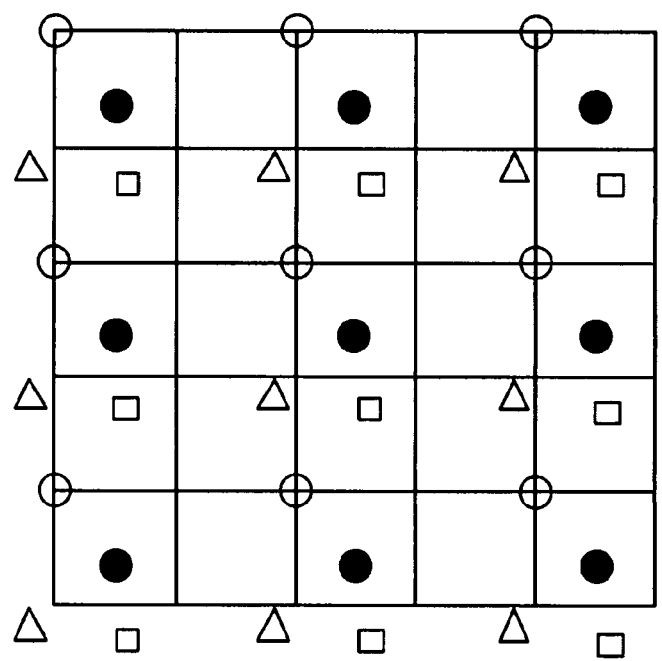
FIG. 3 illustrates an image that is matched by a matching unit, according to an embodiment of the present invention.

The matching unit 132 may match the plurality of images whose scales are adjusted by the scale adjusting unit 120 using the motion information estimated by the estimating unit 131, as shown in FIG. 3. Here, "○", "∆", "□", "●" shown in FIG. 3 indicate pixel values of the respective images whose scales are reduced by the scale adjusting unit 120. Further, when the matching unit 132 matches the plurality of images, pixel locations of the respective images may align or may not align with one another. Here, when the matching unit 132 matches the respective images whose scales are reduced, whether the pixel locations of the respective images align one another may be determined according to information used when the above-described estimating unit 131 estimates the motion information.

The restoring unit 133 may restore an image of a subject using the plurality of images matched by the matching unit 132. Here, the restoring unit 133 may perform a method to increase the scale to restore the image of the subject. That is, when the scale is increased using an image having a pixel value of "○", the restoring unit 133 may increase the scale by restoring pixel values not to be defined.

Figure 4:
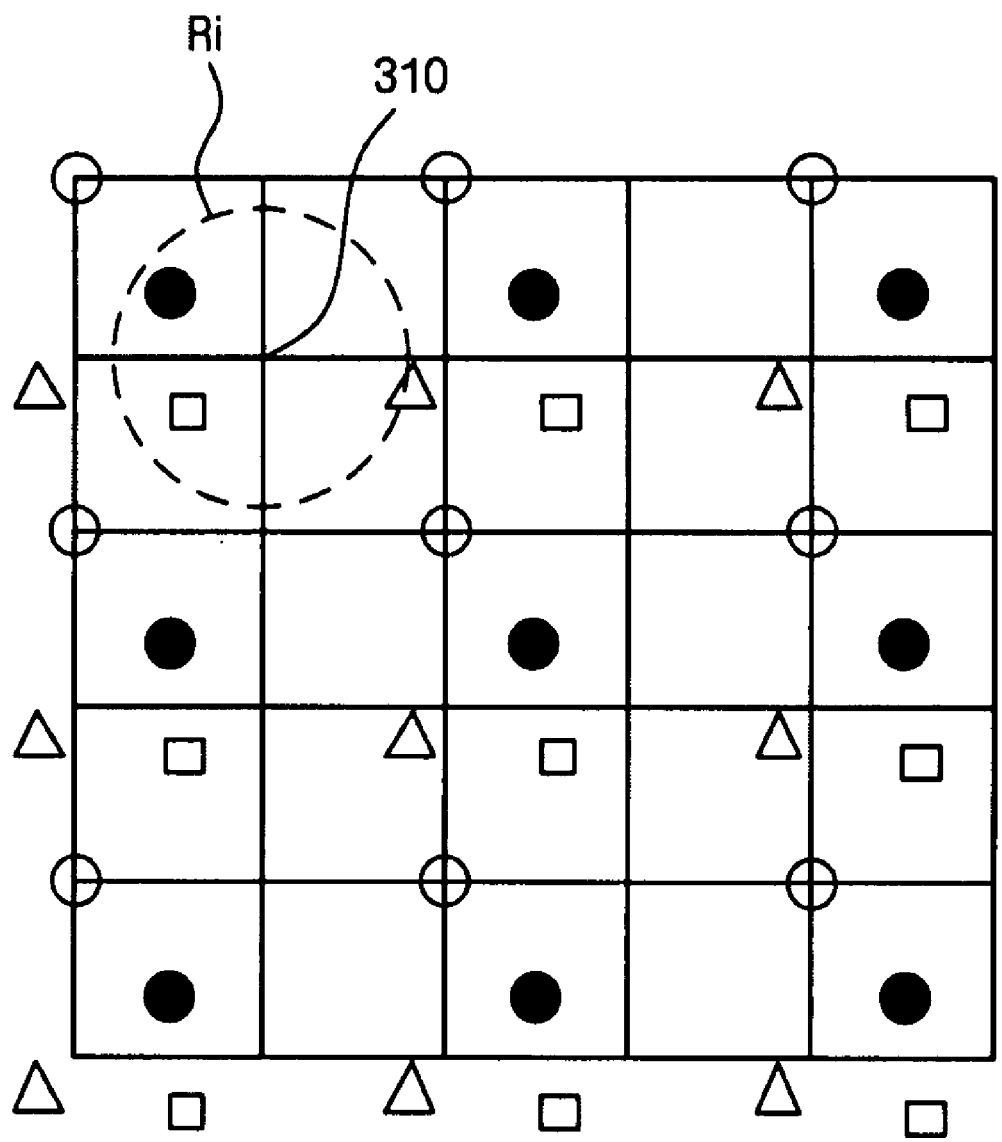
FIG. 4 illustrates a pixel that is restored by a restoring unit, according to an embodiment of the present invention.
Figure 5:
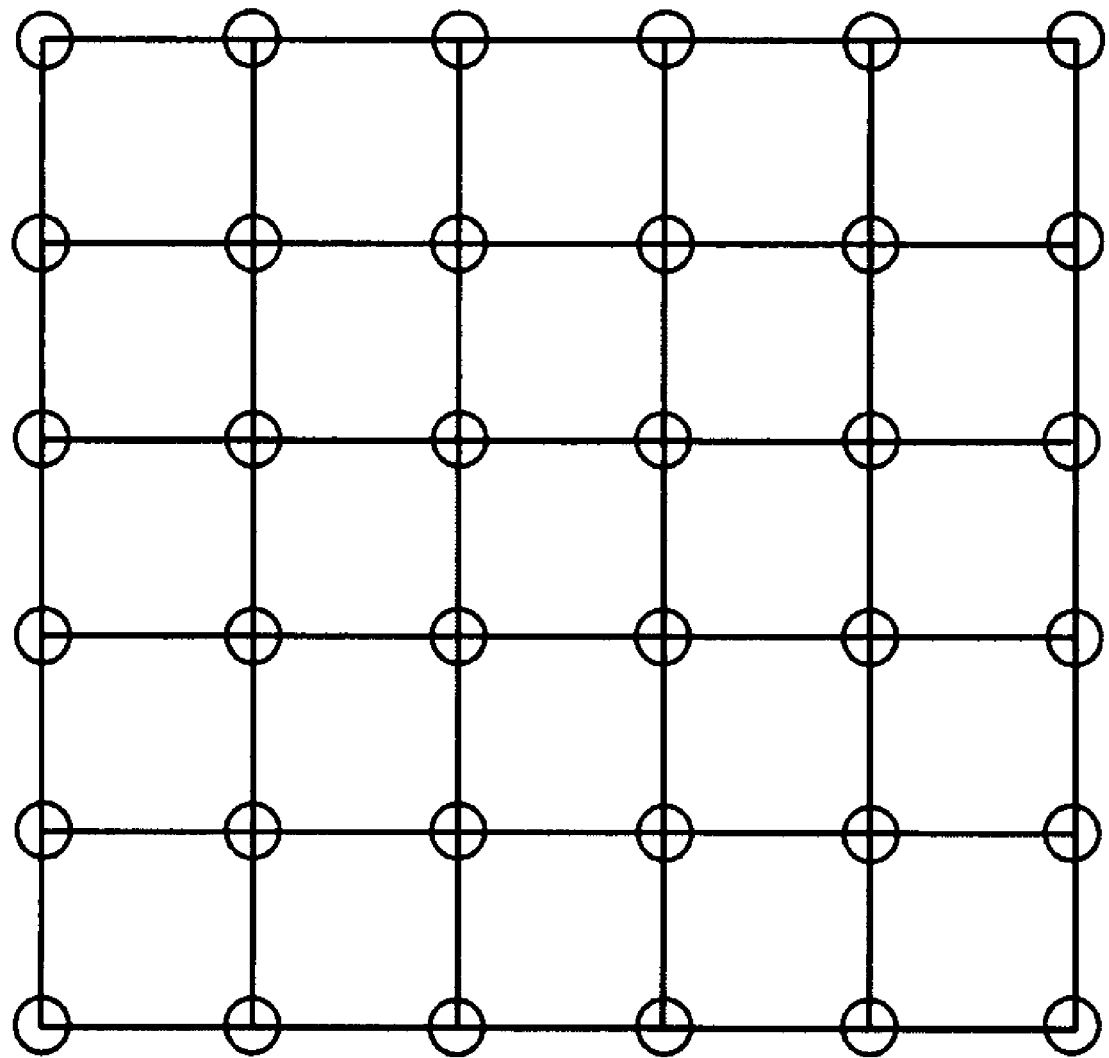
FIG. 5 illustrates an image that is restored by an image restoring unit, according to an embodiment of the present invention.

For example, as shown in FIG. 4, in order to restore a pixel value 310 not to be defined, the restoring unit 133 may restore the pixel value 310 not to be defined using an average value of pixel values included in a predetermined region Ri on the basis of the pixel value 310 to be restored, and may restore an image 320 of a subject, as shown in FIG. 5. Specifically, when the restoring unit 133 restores the pixel value 310 not to be defined in FIG. 4, the restoring unit 133 may use a weighted average of pixel values of the respective images included in the predetermined region Ri. Further, the restoring unit 133 may provide a weighted value to be inversely proportional to the distance between the pixel location 310 not to be defined and pixel locations included in the predetermined region Ri.

As such, a method of restoring an original image using a plurality of images whose scales are reduced by the restoring unit 133 is described in "Super-Resolution Image Reconstruction: A Technical Overview (IEEE Signal Processing Magazine, May 2003)", and thus a more detailed description thereof will be omitted. The embodiment restoring an image is only one example to allow the present invention to be easily recognized, and the present invention is not limited thereto.

Meanwhile, the above-described restoring unit 133 may restore the image of the subject using the plurality of images whose scales are adjusted by the scale adjusting unit 120, but the present invention is not limited thereto. The restoring unit 133 may restore the image of the subject using the plurality of images whose scales are adjusted by the scale adjusting unit 120 and predetermined images acquired by the image acquiring unit 110.

Here, the restoring unit 133 may use the predetermined images acquired by the image acquiring unit 110 when restoring the image of the subject in order to compensate for details in the restored image of the subject.

Figure 6:
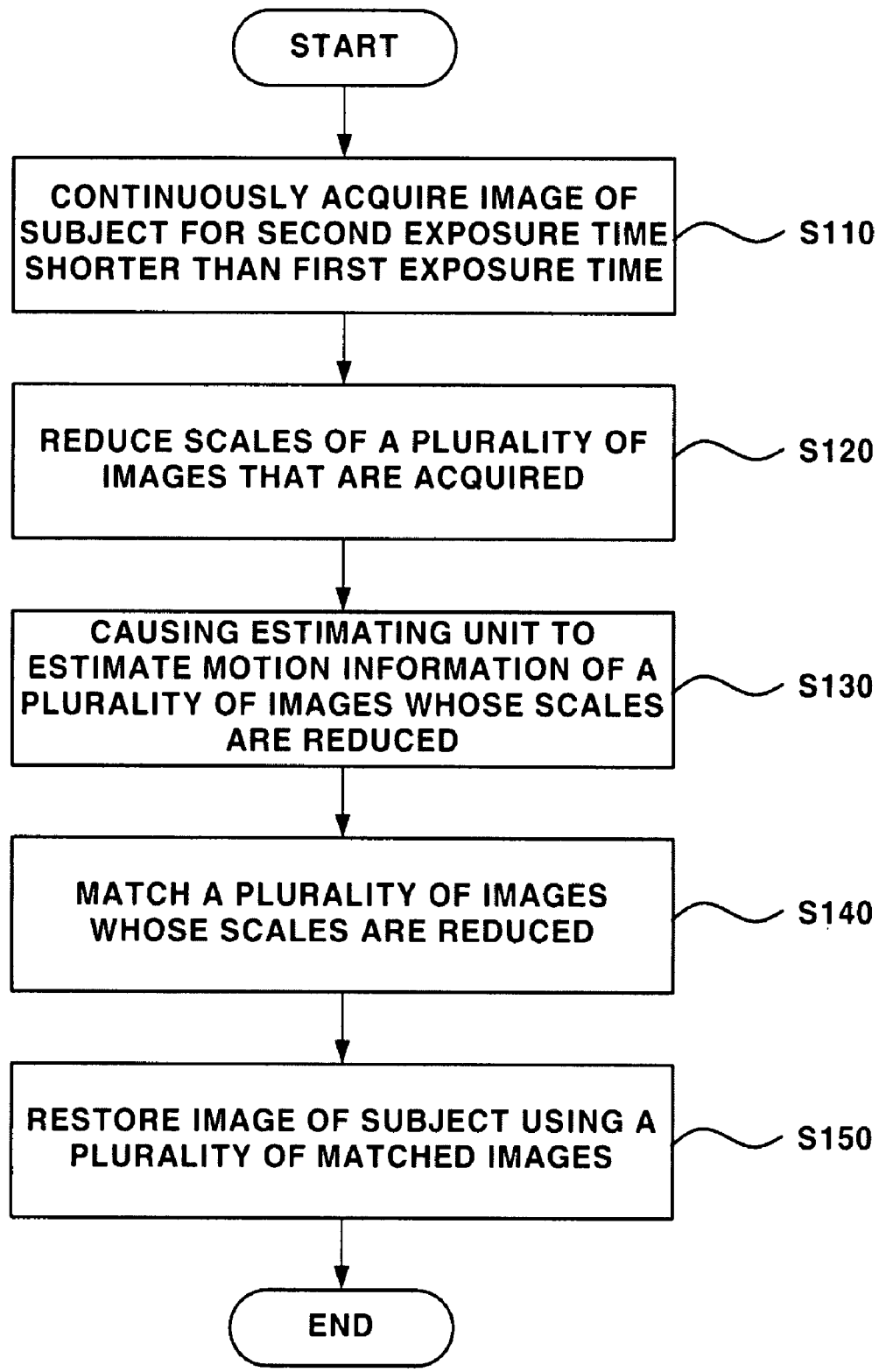
FIG. 6 illustrates a method of preventing image degradation due to shaking of an image photographing device, according to an embodiment of the present invention.

FIG. 6 illustrates a method of preventing image degradation due to shaking of an image photographing device, according to an embodiment of the present invention. Though embodiments are described with reference to particular units, with corresponding particular operations, embodiments of the present invention should not be limited thereto. Aspects of the invention may be accomplished through varying units and varying operations.

As shown in FIG. 6, according to a method of preventing image degradation due to shaking of an image photographing device, according to an embodiment of the present invention, images of a predetermined subject are continuously acquired using a second exposure time that is shorter than a first exposure time in Operation S110, e.g., by the image acquiring unit 110. Here, the first exposure time may be understood as an automatic exposure time, e.g., an exposure time automatically selected by a metering system, and the second exposure time may be understood as a time of sufficiently short duration that a motion is not generated in the image photographing device and the subject.

The scales of the plurality of images that are acquired may be reduced in Operation S120, e.g., by the scale adjusting unit 120. Here, the adjusting unit 120 may reduce the scales of the images acquired by the image acquiring unit 110 in order to reduce a memory capacity and an operation amount used when the image restoring unit 130 restores the image of the subject. Further, the scales may be reduced by combining a predetermined number of pixel values in the image acquired by the image acquiring unit 110 and setting the pixel values to one pixel value, or using an average value of a predetermined number of pixel values in the image acquired by the image acquiring unit 110 and a ratio between the first exposure time and the second exposure time, but the present invention is not limited thereto.

Motion information may be estimated among the plurality of images whose scales are reduced in Operation S130, e.g., by the estimating unit 131. In an embodiment, the estimating unit 131 may estimate all of the region motion information. Further, in an embodiment, the description is made of the case where when N images are acquired by the image acquiring unit 110, all of the region motion information of each of (N−1) images are estimated.

Using the estimated motion information, the plurality of images whose scales are reduced may be matched in Operation S140, e.g., by the matching unit 132. Here, when the matching unit 132 matches the respective images, the pixel locations in the respective images may align or may not align one another. As such, the pixel locations of the respective images align or do not align one another when matching the respective images may be determined according to the information used when estimating the motion information. Further, in an embodiment, the case where when the image acquiring unit 110 acquires the N images, the first image is matched with the (N−1) images using the motion information estimated by the estimating unit 131.

The image of the subject may be restored using the plurality of images that are matched by the matching unit 132 in Operation S150, e.g., by the restoring unit 133.

Here, when the restoring unit 133 restores the image of the subject, the restoring unit 133 may use the plurality of matched images or use the plurality of images matched to compensate for details of the restored image of the subject and the predetermined images acquired by the image acquiring unit 110.

For example, shown in FIG. 4, in order to restore a pixel value 310 not to be defined, the restoring unit 133 restores the pixel value 310 not to be defined by using an average value of pixel values included in a predetermined region Ri on the basis of the pixel value 310 to be restored, and may restore an image 320 of a subject, as shown in FIG. 5. Specifically, when the restoring unit 133 restores the image of the subject as shown in FIG. 5, the restoring unit 133 may compensate for the detail of the restored image using the average value of the pixel values and the predetermined images acquired by the image acquiring unit 110.

According to an apparatus and method of preventing image degradation due to shaking of an image photographing device, according to the embodiment of the present invention, a plurality of images may be acquired for an exposure time shorter than an automatic exposure time in order to prevent image degradation due to the shaking of an image photographing device, resolutions of the plurality of acquired images may therefore be reduced, and an image of a subject may be restored using the plurality of images whose resolutions are reduced, which may reduce a required memory capacity Further, misalignment of the plurality of images that are continuously acquired is estimated without providing a sensor (for example, a Gyro sensor) for preventing image degradation due to shaking of the image photographing device, and the image of the subject is restored on the basis of the estimated result, which leads to a small-sized and small-weighted image photographing device.

Meanwhile, the term "unit" used in the present embodiments, that is, "module" or "table" means software, or a hardware component such as an FPGA (Field Programmable Gate Array) or an ASIC (Application Specific Integrated Circuit) and the modules each perform assigned functions. However, the modules are not limited to software or hardware. The modules may be configured in an addressable storage medium, or may be configured to run on at least one processor. Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The operations provided by the components and the modules may be combined into fewer components and/or modules may be separated into additional components and modules. In addition, the components and the modules may be arranged to execute at least one CPU in a device.

According to the apparatus and method of preventing image degradation due to shaking of the image photographing device, according to the embodiment of the present invention, the following effects may be obtained.

Since the image of the subject is restored using the plurality of images acquired by the image photographing device, an optical system and a driving system compensating for shaking do not need to be provided. Therefore, it is possible to easily achieve a small-sized and lightweight image photographing device and to reduce manufacturing costs.

Further, after reducing the scales of the plurality of images acquired by the image photographing device, the plurality of images may be used when the image is restored, which may reduce a required memory capacity and a required operation amount when the image is restored.

One or more embodiments of the present invention have been described with reference to block diagrams or flowchart illustrations of an apparatus and a method of preventing image degradation due to shaking of an image photographing device. It may be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, to cause a series of operations for implementing the operations specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the operations specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And, each block of the block diagrams may represent a module, segment, or portion of a code, which comprises one or more executable instructions for implementing the specified logical function(s). It should also be noted that in some alternative implementations, the operations noted in the blocks may occur out of order. For example, two blocks shown in succession may in fact be substantially executed concurrently or the blocks may sometimes be executed in reverse order depending upon the functionality involved.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for preventing image degradation due to shaking of an image photographing device, the apparatus comprising:
    an image acquiring unit to acquire a plurality of images of a predetermined subject using a second exposure time shorter than a first exposure time;
    a scale adjusting unit to decrease a data size of acquired images by reducing scales of the plurality of acquired images; and
    an image restoring unit to restore images of the subject using the plurality of images whose scales have been reduced,
    wherein the scale adjusting unit reduces the scales of the acquired images using an average value among a predetermined number of pixel values in the acquired images and a ratio between the first exposure time and the second exposure time.

2. The apparatus of claim 1, wherein the scale adjusting unit adds a predetermined number of pixel values to the acquired images so as to reduce the scales of the obtained images.

3. The apparatus of claim 1, wherein the image restoring unit comprises:
    an estimating unit to estimate motion information among the plurality of acquired images;
    a matching unit to match the plurality of acquired images using the estimated motion information; and
    a restoring unit to restore the images of the subject using the plurality of matched images.

4. The apparatus of claim 3, wherein the estimating unit estimates all of the region motion information among continuous images.

5. The apparatus of claim 3, wherein the restoring unit restores the images of the subject using the plurality of matched images and predetermined images acquired by the image acquiring unit.

6. The apparatus of claim 3, wherein the restoring unit restores pixel values to be restored in the plurality of matched images using pixel values existing in a predetermined region on the basis of the pixel values to be restored.

7. A method of preventing image degradation due to shaking of an image photographing device, the method comprising:
- acquiring a plurality of images of a predetermined subject using a second exposure time shorter than a first exposure time;
- reducing data size of acquired images by reducing scales of the plurality of acquired images; and
- restoring images of the subject using the plurality of images whose scales have been reduced,
- wherein the reducing of the scales comprises reducing the scales of the acquired images using an average value among a predetermined number of pixel values in the acquired images and a ratio between the first exposure time and the second exposure time.

8. The method of claim 7, wherein the reducing of the scales comprises adding a predetermined number of pixel values in the acquired images so as to reduce the scales of the obtained images.

9. The method of claim 7, wherein the restoring of the image comprises:
- estimating motion information among the plurality of acquired images;
- matching the plurality of acquired images using the estimated motion information; and
- restoring the images of the subject using the plurality of matched images.

10. The method of claim 9, wherein the estimating of the motion information comprises estimating all of the region motion information among continuous images.

11. The method of claim 9, wherein, in the restoring of the images, the images of the subject are restored using the plurality of matched images and the predetermined images acquired by the image acquiring unit.

12. The method of claim 9, wherein, in the restoring of the images, pixel values to be restored in the plurality of matched images are restored using pixel values existing in a predetermined region on the basis of the pixel values to be restored.

13. The method of claim 7, wherein the first exposure time is an automatically selected exposure time.

14. At least one non-transitory medium comprising computer readable code to control at least one processing element to implement the method of claim 7.

* * * * *